United States Patent [19]
Rood, Jr.

[11] 4,390,376
[45] Jun. 28, 1983

[54] TINE ASSEMBLY AND METHOD FOR REMOVAL OF DEBRIS FROM DOWN COTTON CLUMPS

[76] Inventor: William E. Rood, Jr., 3134 E. Fargo Cir., Mesa, Ariz. 85203

[21] Appl. No.: 338,219

[22] Filed: Jan. 11, 1982

[51] Int. Cl.³ ............................................. A01D 46/08
[52] U.S. Cl. ........................................... 134/6; 134/16; 134/63; 134/67; 56/28; 56/49; 56/364
[58] Field of Search .......................... 134/6, 16, 63, 67; 56/28, 49, 364

[56] References Cited

U.S. PATENT DOCUMENTS

| | | | |
|---|---|---|---|
| 2,670,584 | 3/1954 | Rood, Jr. et al. | 56/28 |
| 3,342,310 | 9/1967 | Gray | 56/28 X |
| 3,399,518 | 9/1968 | Gray | 56/28 |
| 3,983,888 | 10/1976 | Edwards | 134/6 X |

FOREIGN PATENT DOCUMENTS 686668  10/1979  U.S.S.R. .................................. 56/28

*Primary Examiner*—Arthur D. Kellogg
*Attorney, Agent, or Firm*—Cahill, Sutton & Thomas

[57] ABSTRACT

An apparatus for removing dirt and debris from clumps of down cotton that are released from slots of a group of retrieving belts as the belts pass around a rotating pulley that causes the slots to open includes a first group of approximately semi-circular, parallel tines disposed adjacent to the portions of the belts passing around the pulley. A plurality of fingers extending from the pulley and between the belts into the region bounded by the first group of tines and the belts urges the released clumps slidingly along the tines, and apply forces that loosen dirt and debris, which pass between the tines. The clumps ejected from the upper end of the region are received by pegs of a rotating peg drum and are moved against a second group of approximately semi-circular, parallel tines. The pegs tend to "thump" the cotton clumps as they slide along the second group of tines, further breaking up dried mud and debris therein and causing it to pass outward between the tines of the second group. Clumps ejected from the upper portion of the tines and the peg drum are conveyed to a cotton cleaner including a cleaning saw assembly "saw setting" bar, a kicker wheel, and a doffer-fan assembly for further cleaning of the clumps.

22 Claims, 6 Drawing Figures

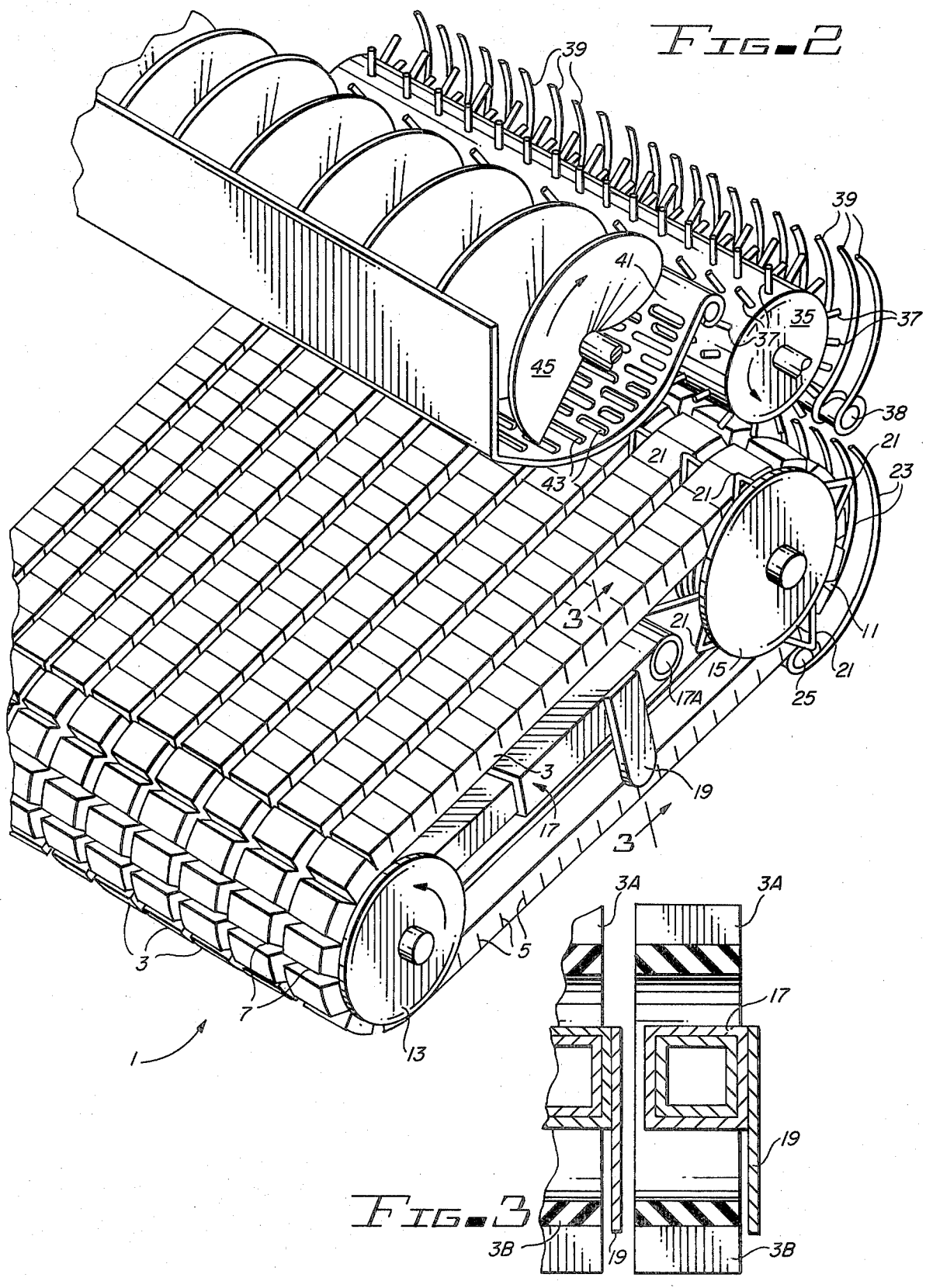

TINE ASSEMBLY AND METHOD FOR REMOVAL OF DEBRIS FROM DOWN COTTON CLUMPS

BACKGROUND OF THE INVENTION

The invention relates to cotton cleaning devices, especially down cotton (i.e., cotton that lies on the ground after an initial picking or stripping operation) cleaning devices suitable for use in conjunction with slotted belt cotton retrieving machines of the types disclosed in U.S. Pat. Nos. 2,670,584, 3,164,027, 3,173,544, 3,157,285, 3,302,247, 3,425,097, 3,217,878, 3,467,991, 3,342,310, 3,305,898, 3,399,767, 3,399,518 and 4,265,078. Although some of the devices disclosed in the foregoing references have met with substantial success in reclaiming down cotton that was previously lost, a significant amount of down cotton (especially pieces or "locks" of down cotton matted together in clumps by dried mud, twigs, and other debris) has been difficult to adequately clean by means of prior machines. The ground conditions and weather conditions under which cotton is grown in the United States vary widely, and consequently, cotton farming and harvesting techniques necessarily vary to a considerable degree. Cotton ginning techniques and machinery also vary considerably in different parts of the country. In some parts of the country, down cotton that falls to the ground while cotton picking machines are used to often quite clean, and certain ones of the prior slotted belt down cotton retrieving machines and cotton cleaning devices included therein have been very successful in providing relatively clean cotton that is readily accepted by local cotton ginners.

At this point, it is important to note that local cotton ginners have standards of cleanliness for cotton that they will accept for ginning. Cotton gins generate a great deal of air pollution in the form of dust if exceptionally dirty cotton is passed through them. Authorities responsible for prevention of air pollution often limit the amount of dust that can be exhausted by cotton gins. Moreover, dirt and dust generated by ginning excessively dirty cotton causes dulling of the saws in cotton gins and also causes excessive wear of bearings and other components of cotton gins. Furthermore, excessive amounts of airborne dust presents a health hazard to cotton gin operating personnel.

Sometimes, adverse weather conditions, such as intense hailstorms, result in exceptionally large amounts of excessively "dirty" down cotton that contains a large amount of dried mud, twigs, leaves and other debris in a locality wherein down cotton is usually relatively clean. A local cotton ginner will be reluctant to accept such retrieved down cotton for ginning.

The "handling" involved in processing cotton through cotton cleaning machines tends to break cotton fibers, thereby lowering the grade of the final product and also lowering the price per bale that the final product will bring in the market. Therefore, it would be desirable to subject down cotton to as little stress to its cotton fibers as possible as tufts or clumps of cotton are processed to eliminate dirt therefrom before the cotton is delivered to a cotton gin. Despite the past advances in the art of retrieving and cleaning down cotton, there remains an unmet need for machines and methods for reclaiming, at reduced expense, more of the down cotton that exists in various portions of the U.S. under various inclement weather conditions and for cleaning such reclaimed down cotton to a sufficient degree that it is acceptable to local cotton ginners, while subjecting the fibers of the reclaimed down cotton to as little stress as possible while still achieving a satisfactory degree of removal of dirt and debris therefrom.

There also remains an unmet need for a simple, efficient and economical means of quickly and gently separating the cotton from the dirt and debris that is picked up and released by the belts and preventing this dirt and debris from becoming imbedded in and mixed with the cotton. A further need exists for a means to gently "thump" the pieces of cotton to loosen and separate dirt and debris that is clinging to the clumps of cotton. It is to be noted here that the dirt and debris which adheres to the down cotton usually clings to the outside tips of the cotton fibers and is not imbedded inside of the cotton clumps and this gentle "thumping", if properly and quickly applied, is very efficient in loosening this foreign material and making it possible to separate and remove it from the cotton clumps.

Accordingly, it is an object of the invention to provide an improved economical apparatus and method for cleaning dirt and debris from cotton retrieved by means of slotted belts.

It is another object of the invention to provide an improved, economical apparatus and method for removing as much dirt and debris as possible from retrieved down cotton before further processing of such cotton by means of cleaning saws, and kicker assembly, and the like.

It is another object of the invention to provide an improved, economical apparatus and method for subjecting retrieved ground cotton to as little stress as possible while loosening hardened mud and other debris therefrom to such an extent that the resulting product can be acceptable for ginning without producing excessive amounts of dust.

SUMMARY OF THE INVENTION

Briefly described and in accordance with one embodiment thereof, the invention provides a first tine assembly including a plurality of curved, parallel, spaced tines disposed adjacent to the upper end of an assembly including a plurality of spaced, transversely slotted cotton retrieving belts that pass over an upper drum pulley and a lower pulley assembly. A first region is bounded by the inner portion of the tine assembly and the outer surfaces of the belts as they pass over the drum pulley. The radii of curvature of the tines pass approximately through the axis of rotation of the drum pulley. As the belts pass around the drum pulley, the slots open, releasing clumps of cotton into the first region. In the described embodiments of the invention, a plurality of fingers attached to the drum pulley between the belts extend into the first region as the drum pulley rotates, engaging the clumps of cotton, causing them to slide along the inner surfaces of the tines. Some dirt and debris are loosened from the clumps as they are moved through the first region. The loosened dirt falls between the tines, and loosened debris in the form of twigs, leaves, and the like tend to become aligned with the tines and then passes between them. As the clumps pass out of the first region, they are tossed upward to a receiving device. In the described embodiments of the invention, the receiving device includes a peg drum having a plurality of pegs that extend radially outward to engage the clumps. A second tine assembly includes a plurality of curved, parallel, spaced tines disposed adjacent to the peg drum. The second region is bounded by a portion of the peg drum and the inner portion of the second tine assembly. The radii of curvature of the tines of the second tine assembly pass approximately through the axis of rotation of the peg drum. As the peg drum rotates, the ends of the pegs tend to thump the clumps of cotton, breaking up and loosening pieces of dried mud therein and further loosening dirt and debris from the clumps. The pegs of the rotating peg drum force the clumps to slide along the tines of the second tine assembly as the peg drum rotates, and the loosened dirt and debris that become separated from the clumps fall or are thrown between those tines. As the clumps emerge from the upper end of the second region, they are tossed into another receiving device, which in one described embodiment of the invention, includes an auger that conveys the clumps to the teeth of a rotating cleaning saw assembly. The teeth of the cleaning saw grasp the clumps and move them past a "saw setting bar" that further "sets" the clumps of cotton into the teeth of the cleaning saw by spreading or combining the clump out so that it is engaged by more of the teeth of the cleaning saw. Then cleaning saw moves the clumps past a rotating "kicker" that in effect "thumps" the clumps to further loosen dirt and debris therein. An "air wash" current produced by a doffer-fan assembly carries the dirt and debris loosened by the "kicker" away from the clumps held by the teeth of the cleaning saw assembly. The clumps are carried by the teeth of the cleaning saw assembly close to the rotating doffer-fan. The blade of the doffer-fan doffs the clumps from the teeth of the cleaning saw assembly and carries them into an exhaust duct. In one described embodiment of the invention, the cotton engaging fingers, the first and second tine assemblies, and the peg drum are attached to a slotted belt assembly that is pushed along the ground on which down cotton lies. In another described embodiment of the invention, the fingers, the peg drum, the first and second tine assemblies, the auger, the cleaning saw assembly, and the doffer-fan assembly are attached to an assembly that tows the plurality of belts.

BRIEF DESCRIPTION OF THE DRAWINGS

FIG. 2 is an isometric view of the embodiment of the invention shown in FIG. 1.

FIG. 3 is a partial section view taken along section line 3—3 of FIG. 2.

DESCRIPTION OF THE INVENTION

Before describing the structure and operation of the disclosed embodiments of the invention, it should be helpful to note that dirt and debris that adheres to down cotton usually clings to the outside tips of the cotton fibers, and usually is not embedded inside of the cotton clumps unless there has been mud on the ground and the mud has been squeezed into the interior of the cotton clumps as a result of trampling or being run over by wheels of a machine.

Figure 1:
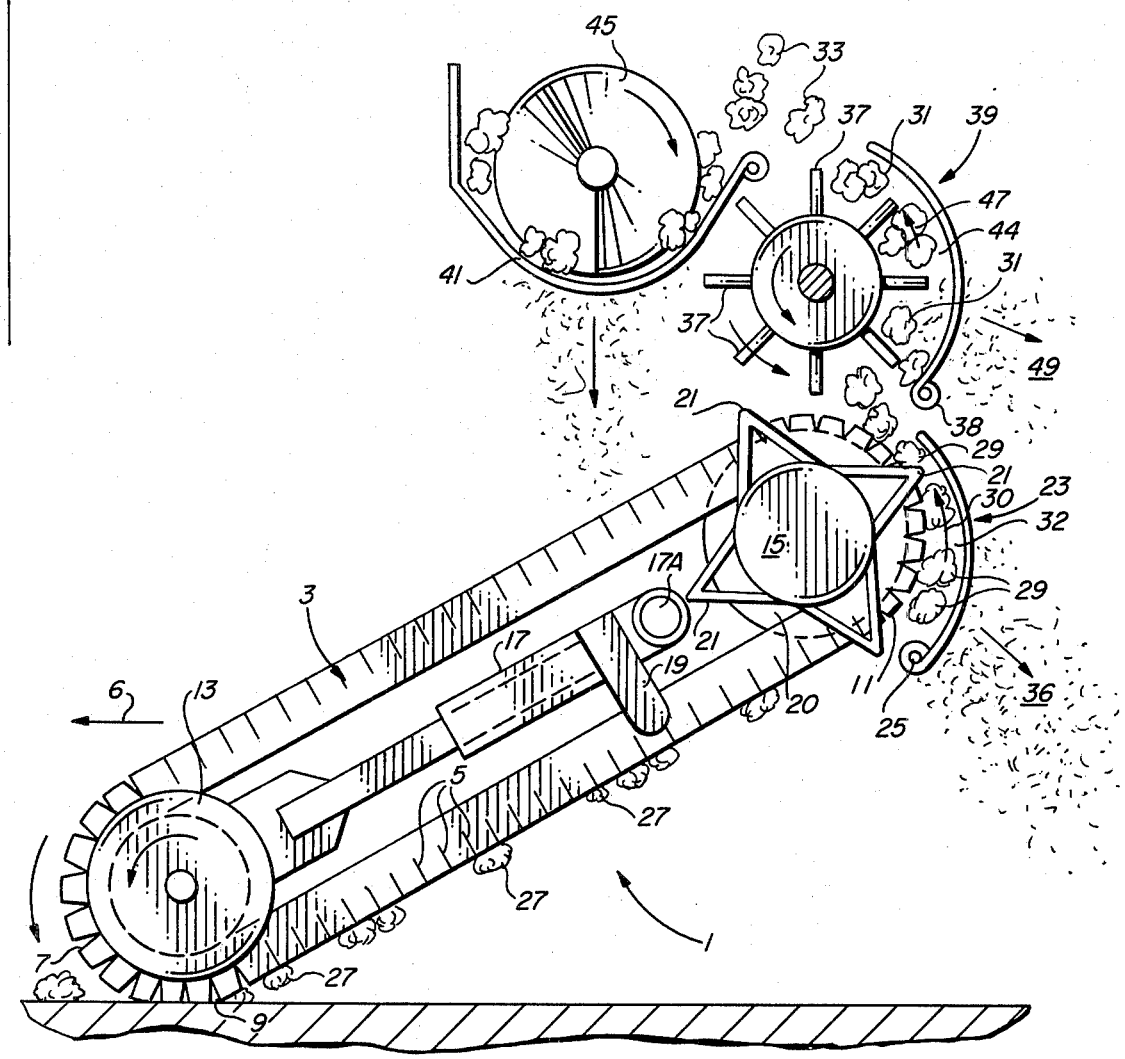
FIG. 1 is a partial side view of one embodiment of the invention.

Turning now to the drawings, especially FIGS. 1–3, down cotton retrieving machine 1 includes a plurality of slotted retrieving belts of the type described in U.S. Pat. No. 2,670,584 disposed on an upper pulley drum 15 and a plurality of independently suspended lower pulleys 13. The lower pulleys 13 are suspended by means of a plurality of belt tightening systems 17 of the type that is disclosed in detail in U.S. Pat. No. 3,164,027. The belt tightening systems 17 are pivotally mounted on a bar 17A which is supported on a frame member (not shown) of a down cotton retrieving apparatus that incorporates a number (typically 3) of the machines shown in FIG. 2. The upper drum pulley assembly 15 is supported by end plates (not shown) that are attached to the frame of the cotton retrieving apparatus.

Each of the slotted belts 3 includes a plurality of slots such as 5 which open as the machine 1 moves in the direction indicated by arrow 6 when the slotted belt passes around lower pulley 13, as indicated at 7. The slots close upon and grasp fibers of "clumps" of down cotton 27 and carry them upward and rearward toward drum pulley assembly 15. The slots then open, as indicated at 11, and release the cotton clumps.

The machine 1 includes a tine assembly including a plurality of tines 23 disposed on a bar 25 adjacent to the curved portions of the belts 3 passing around drum pulley 15. A plurality of triangular "finger elements" 21 are attached to drum pulley 15 and extend outward therefrom on either side of each of the belts 3 and engage clumps 29 that have been released into the region bounded by tines 23 and the belts 3. The clumps 29 are urged along the tines 23 and the curved portion of the belts 3 around pulley 15 as pulley 15 rotates counter-clockwise, as indicated by the illustrated arrow, as the finger elements 21 force the cotton clumps 29 upward in the direction indicated by arrow 30 (FIG. 1). As the cotton clumps are moved through the region 32 as they slide upward along tines 23, the clumps 29 are thumped and are generally somewhat "roughened up" by the forces applied thereto by belts 3, fingers 21, and tines 23. It will be noted that typically machine 1 moves forward in the direction of arrow 6 at approximately five miles per hour, causing drum pulley 15 to rotate at approximately 168 revolutions per minute. This causes the processing or "handling" of the cotton clumps 29 in region 32 and the above-mentioned forces applied to the clumps 29 to tend to break up pieces of dried mud binding the cotton clumps 29 together and otherwise loosen dirt and debris therefrom. Some of the loosened dirt and debris are thrown outward between the tines 23, as indicated at 36.

As the clumps 29 are ejected from the upper portion of the region 32, they have sufficient upward momentum to be tossed between the pegs 37 of a peg drum 35, which rotates at approximately 200 rpm. in a counter-clockwise direction. (It should be noted that in some instances, the fingers 21 can be omitted, if the above mentioned "thumping" is not needed. In these instances the movement of the belts 3 around drum pulley 15 is adequate to move the clumps 29 from the bottom to the top of region 32 and toss the clumps 29 to peg drum 35.)

The clumps 29 thereby are moved by the pegs 37 into a region 44 between the peg drum 35 and a second group of curved, spaced tines 39 that are mounted on bar 38 and are similar to tines 23.

Both tines 23 and 39 typically are composed of ⅜ inch diameter steel bar material, and are spaced from one-half inch to five eighths of an inch apart. The curvature of tines 23 is such that their respective radii of curvature extend approximately through the axis of rotation of drum pulley 15; similarly, the curvature of tines 39 is such that their respective radii of curvature extend approximately through the axis of rotation of peg drum 35. The distance between the tines 23 and the outer portion of belts 3 curved around drum pulley 15 is approximately two inches. Fingers 21 extend approximately one and one-half inches beyond the outer surface of the curved portion of belts 3 into region 32. The distance between an imaginary cylinder traced out by the ends of pegs 37 and the inside surfaces of tines 39 is approximately one-half inch.

The pegs 37, which are approximately two inches long, are aligned in staggered rows on the surface of a drum shaped cylinder to which the pegs are attached and from which they radially extend. The pegs 37 are spaced approximately two inches apart, and the alternate rows are offset or staggered by one inch. The diameter of each of the pegs is approximately three eighths of an inch.

As peg drum 35 rotates counter-clockwise, the pegs thump and move the cotton clumps designated by reference numeral 31 in region 44, forcing them against the tines 39 and sliding the clumps 31 upward in the direction indicated by arrow 47. This causes substantial further breaking up of dried mud and debris in the clumps 31, causing more trash and dust to be thrown out of region 44 between tines 39, as indicated at 49 in FIG. 1. Both the tines 39 and the tines 23 tend to align loosened twigs and other debris with the tines as the clumps slide upward along the tines, allowing such twigs and debris to pass between the tines.

The clumps 31 are tossed upward out of the upper end of region 44, as indicated at 33, and into an auger assembly including an auger housing 41 and an auger blade 45 which rotates at approximately 150 rpm. in the clockwise direction.

Typically, three or more of the machines 1 that may be installed on a single down cotton retrieving apparatus share a common auger assembly, which moves the partially cleaned clumps 33 from the respective machines 1 toward a cleaning saw assembly, a saw setting bar, a kicker wheel, and a doffer-fan assembly which further cleans the clumps and remove dust and debris therefrom before ejecting the cleaned cotton into a bin for delivery to a cotton gin. It will be appreciated that in some cases the clumps 27 (FIG. 1) that are initially picked up by the belts 3 may include as many as three or more cotton pieces or locks clumped together by twigs, dried mud, leaves, etc. Such cotton clumps are unacceptable to many cotton gins, as previously explained. The above described device will remove a large amount of such dried mud and debris by applying sufficient amounts of force to the clumps to break up the dried mud and debris holding the cotton boles or tufts forming the clump together. Nevertheless, the relatively smooth tines 23 and 29 against which the clumps are forced prevents an undue amount of damage that would significantly degrade the quality of the resulting product.

As indicated in FIGS. 1-3, a plurality of belt guides 19 are attached to the sides of the belt tightening systems 17 to extend between the lower portions 3B of the respective slotted belts 3. In FIG. 3, a reference numeral 3A designates the upper portion of each of the belts 3. The belt guides 19 act to prevent the belts 3 from climbing or "jumping" the disc-like flanges that constitute the walls of the respective pulleys included in drum pulley assembly 15.

Figure 6:
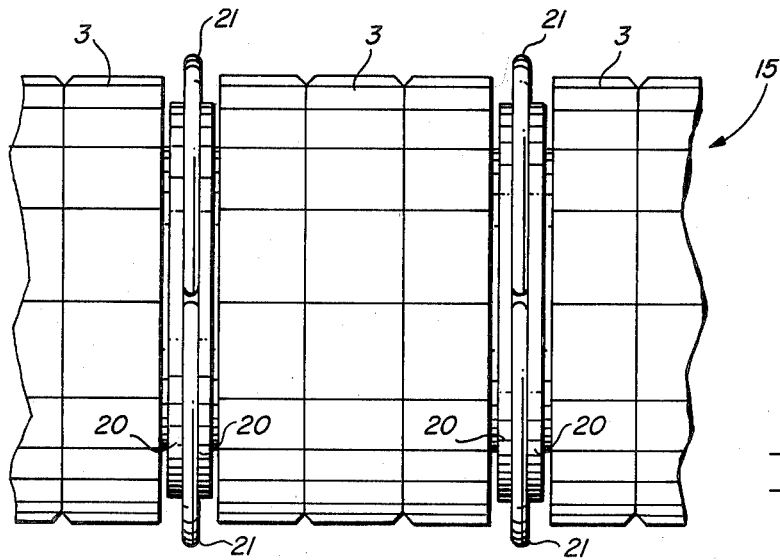
FIG. 6 is a partial end view of the upper pulley assembly shown in FIG. 1.

As shown in both FIGS. 1 and 6, circular belt guide plates 20 are attached to upper pulley drum 15 on either side of each set of the fingers 21. The individual belts 3 ride on the surface of the drum 15 between the circular guide plates 20, which prevent the fingers 21 from engaging the belts 3 and thereby preventing the belts 3 from "climbing" the fingers 21.

One implementation of the above-mentioned cleaning saw, saw setting bar, kicker, and doffer-fan assembly is partially shown in another embodiment of the invention, shown in FIGS. 4 and 5, which will be described next. Similar parts have been designated by the same corresponding reference numerals in the embodiment of the invention shown in FIGS. 1 and 2 and the embodiment of the invention shown in FIGS. 4 and 5.

Figure 4:
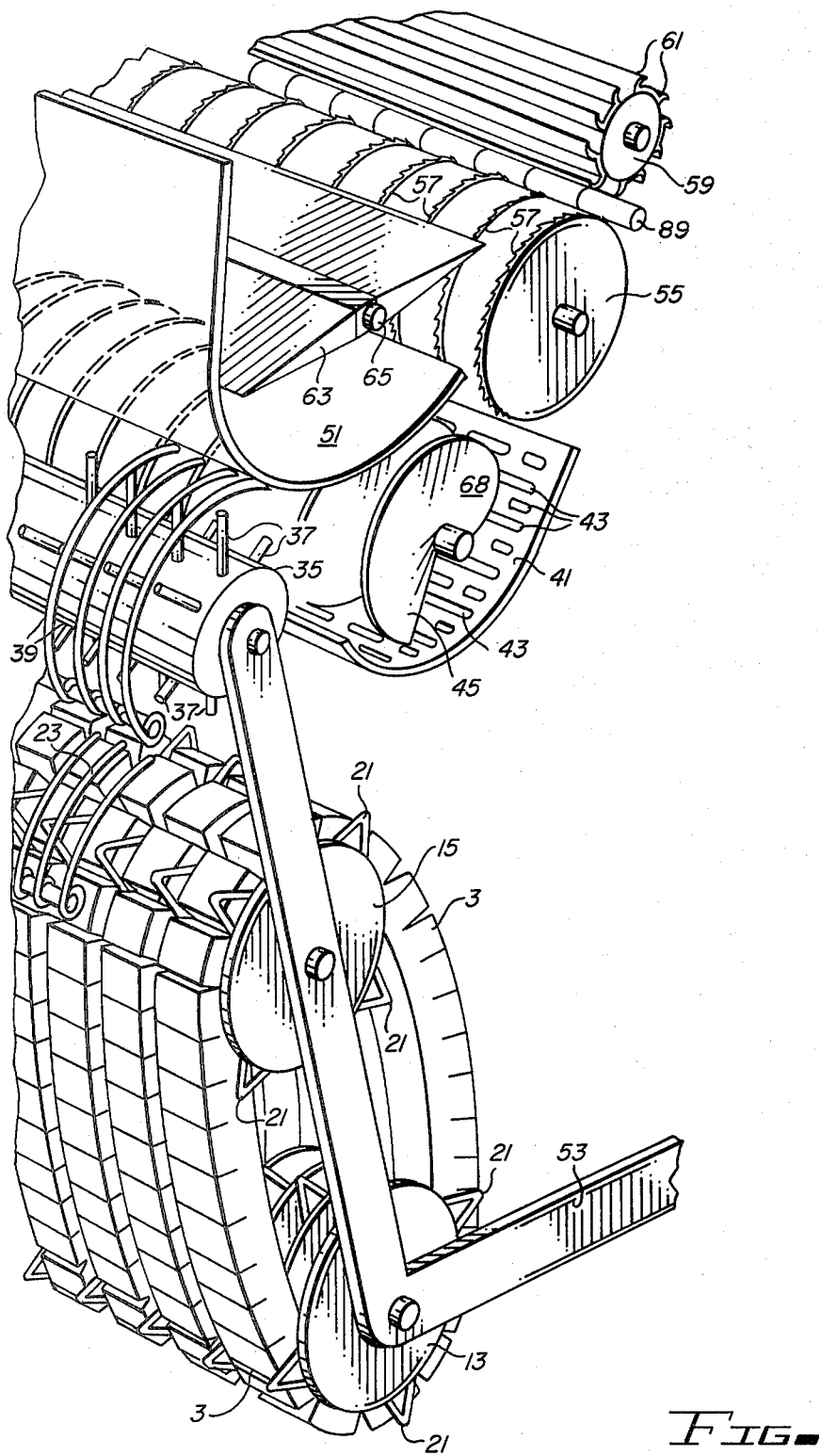
FIG. 4 is a partial isometric view of an alternate embodiment of the invention.
Figure 5:
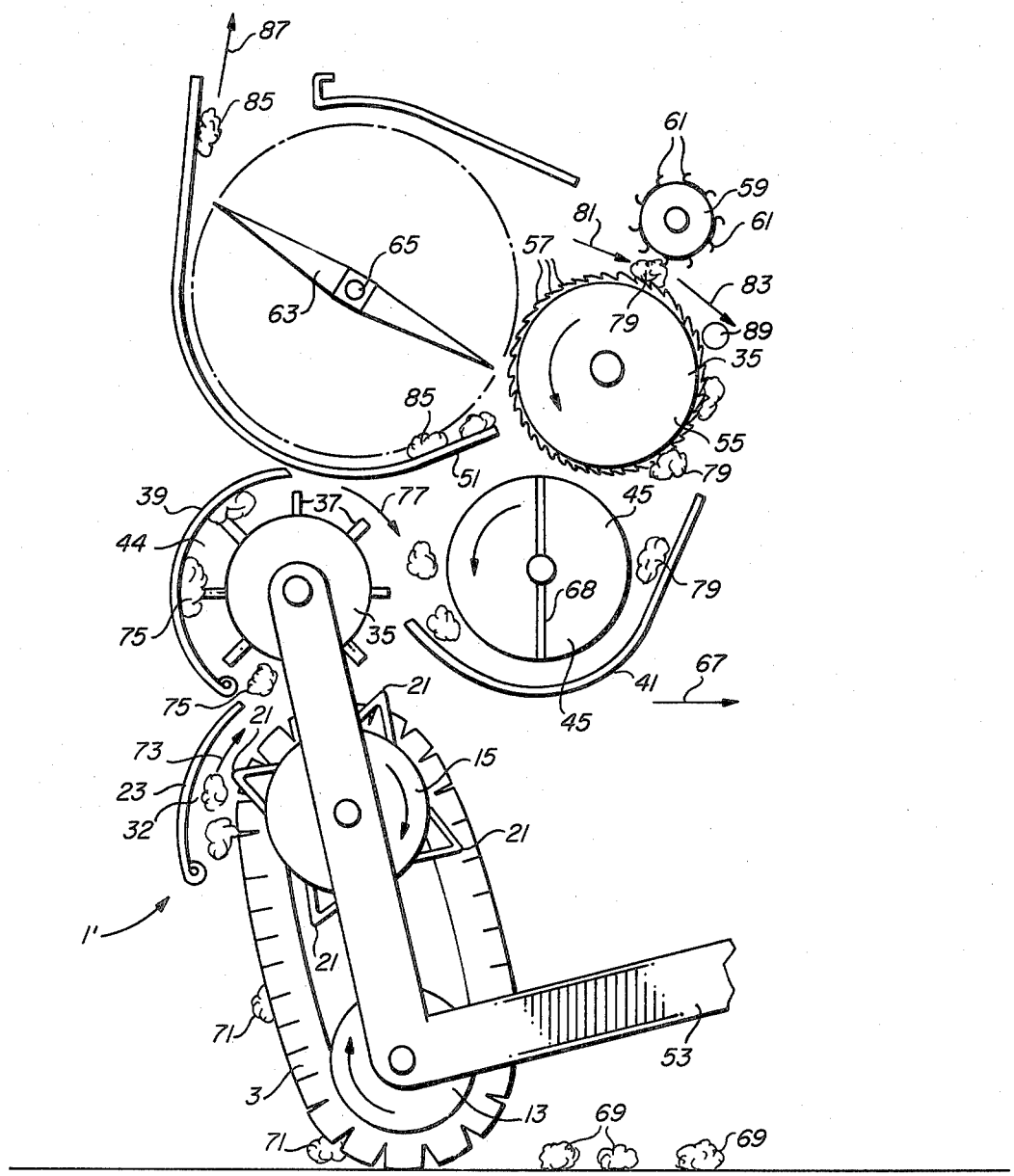
FIG. 5 is a partial side view of the embodiment of the invention shown in FIG. 4.

Before describing the cotton cleaning assembly shown in FIGS. 4 and 5, the portion of the machine 1' including belts 3, pulley support member 53, and upper and lower pulleys 15 and 13, respectively, will be briefly referred to. This latter portion of the machine 1' is described in detail in my copending application entitled "TOWED COTTON RETRIEVING BELT APPARATUS", Ser. No. 311,984, filed Oct. 16, 1981 and incorporated herein by reference. The tines 23 previously shown and described with reference to FIGS. 1 and 2 have been incorporated on the trailing side of the towed retrieving apparatus and are designated by reference numeral 23. The towed retrieving apparatus is pulled by member 53 in the direction indicated by arrow 67 in FIG. 5, causing the upper pulley assembly 15 and the lower pulley assembly 13 to rotate clockwise, as indicated by the arrows in FIG. 5. Pieces of down cotton 69 are run over by the belts 3, the slots of which open as the belts 3 pass around lower pulley 13 and close upon fibers of clumps 69. The belts then carry the clumps upward on the left side thereof, as indicated at 71, in FIG. 5. The clumps 71 are carried into region 32, as indicated by arrow 73, and are moved along tines 23 as fingers 21 engage the clumps 71, moving them further upward in the direction of arrow 73, as previously explained. As before, this causes breaking up and loosening of dirt and debris in the clumps 71. The loosened dirt and debris are thrown rearward between tines 23, and fall to the ground. Clumps 71 emerging from the upper end of region 32 are tossed at peg drum 35, the pegs 37 of which convey the clumps designated by reference numeral 75 into region 44. Region 44 is bounded by a group of spaced curved parallel tines 39 that are similar to tines 39 shown in FIGS. 1 and 2. In FIG. 5, as peg drum 35 rotates clockwise, it breaks up and loosens debris still further as the clumps 75 are tossed into auger housing 41, as indicated by arrow 77 in FIG. 5. Note the peg drum 35 is supported by member 53 so it will move up and down with member 53 as the belts 3 run over irregular ground or obstacles on the ground. Debris loosened by action of pegs 37 is thrown rearward (to the left in FIG. 5) between the tines 39. Auger blade 45, which may be common to a number of towed retrieving assemblies of the type including member 53, pulleys 13 and 15, and belts 3, tosses the clumps designated by reference numeral 79 upward where they are snagged by the teeth of rotating cleaning saw assembly 55, which has teeth 57.

As the clumps 79 are conveyed by teeth 57 of saw assembly 55, past saw setting bar 89, the clumps 79 are thumped by blades 61 of kicker assembly 59, which rotates counter-clockwise, thereby further loosening of debris in the clumps 79 and kicking it downward.

A doffer-fan blade 63 disposed adjacent to cleaning saw assembly 55 creates an "air wash" current in the direction of arrow 81, thereby blowing dust and debris kicked loose by kicker assembly 59 away from clumps 79, as indicated by arrow 83. As the clumps 79 are carried around the top of cleaning saw assembly 55 toward doffer-fan blade 63, the top of doffer-fan blade 63, which has a substantially higher peripheral velocity than teeth 57, doffs clumps 79 off of teeth 57 and into housing 51 of the doffer-fan assembly. These clumps, which by now have been substantially cleaned and broken into relatively elongated pieces of cotton now designated by reference numeral 85, are then exhausted from housing 51 in the direction indicated by arrow 87 in FIG. 5. The blades of cleaning saw assembly may have a diameter of approximately ten inches and may rotate at approximately 400 revolutions per minute. The blade of doffer-fan 63 may have a diameter of approximately sixteen inches and may rotate at approximately 1712 revolutions per minute.

It should be noted that the belts 3 continuously pick up dirt and debris in addition to tufts and clumps of cotton. The above described assemblies provide a simple, efficient and economical means of quickly and gently separating the cotton from this dirt and debris that is picked up and released by belts and preventing this dirt and debris from becoming mixed with the cotton. The above described assemblies gently "thump" the tufts and clumps of cotton to very efficiently loosen and separate dirt and debris that clings to the tufts and clumps of cotton and allows such dirt and debris to fall to the ground or to be efficiently removed by subsequent cleaning elements, such as the disclosed cleaning saw, saw setting bar, kicker wheel, and doffer-fan assemblies.

The above-described assemblies of tines 23 and 39, fingers 21, and peg drum 35 greatly reduce the amount of dried mud and other debris embedded in or clinging to the retrieved cotton submitted to a cotton gin, to the extent that the retrieved cotton can be accepted for ginning without fear of undue amounts of dust pollution and consequent deterioration of cotton ginning equipment, discomfort to cotton gin employees, and violations of air pollution standards.

While the invention has been described with reference to several particular embodiments thereof, those skilled in the art will be able to make various modifications to the disclosed apparatus and operating method without departing from the true spirit and scope of the invention.

What is claimed is:

1. An apparatus for removing dirt and debris from clumps of cotton that are released from slots of a group of retrieving belts as the belts pass around a rotating pulley means that causes the slots to open, said apparatus comprising in combination:
    (a) first means for catching the released clumps in a lower portion of a curved region that is bounded by the portions of the belts passing around said pulley means and a first group of curved, spaced tines disposed adjacent to said portions of said belts;
    (b) second means for
        (i) forcing the clumps to move along said tines of said first group from the lower portion of said first region to an upper portion thereof, said forcing loosening dirt and/or debris from the clumps, the loosened dirt and/or debris falling between said tines of said first group; and
        (ii) ejecting the clumps from said upper portion of said first region.

2. The apparatus of claim 1 wherein said tines of said first group are parallel to each other and wherein each has an approximately semicircular portion.

3. The apparatus of claim 2 wherein the radius of curvature of said semicircular portions of said tines of said first group extend radially outward from an axis of rotation of said pulley means.

4. The apparatus of claim 3 wherein said second means includes a plurality of cotton engaging elements and means for moving said cotton engaging elements from the lower portion of said first region to the upper portion thereof.

5. The apparatus of claim 3 wherein said cotton engaging elements include finger elements attached to said pulley means and extending outward therefrom between said belts.

6. The apparatus of claim 3 wherein said tines of said first group each lie in a plane that is perpendicular to the axis of rotation of said pulley means.

7. The apparatus of claim 3 further including third means for moving the ejected clumps into a lower portion of a second region, a rotating peg drum including a plurality of pegs extending radially outward, and a second group of curved, spaced tine, said tines if said second group and said peg drum bounding said second region.

8. The apparatus of claim 7 wherein said pegs press into the clumps in said second region and move the clumps along said tines of said second group from the lower portion of said second region to an upper portion thereof as said peg drum rotates, said pegs further breaking up and loosening mud, dirt and/debris in said clumps, that loosened mud, dirt and/or debris falling between said tines of said second group.

9. The apparatus of claim 8 wherein said tines of said second group are parallel to each other and wherein each has an approximately semicircular portion.

10. The apparatus of claim 9 wherein the radii of curvature of said semicircular portions of said tines of said second group extend radially outward from an axis of rotation of said peg drum.

11. The apparatus of claim 9 further including a cleaning saw assembly and means for receiving clumps from said upper portion of said second region to teeth of said cleaning saw assembly.

12. The apparatus of claim 11 further including kicker means disposed adjacent to said cleaning saw assembly for engaging said clumps carried by said teeth to thump the clumps to further loosen dirt and/or debris therefrom and kick the dirt and/or debris away from the clumps.

13. The apparatus of claim 12 further including means for blowing an air current against the clumps as they are carried past said kicker means to carry the dirt and/or debris away from the clumps.

14. The apparatus of claim 13 further including means for doffing the clumps from said teeth of said cleaning saw assembly after the clumps have been carried past said kicker means.

15. The apparatus of claims 13 or 14 wherein said air blowing means of said doffing means are included in a doffer-fan assembly that also blows the clumps to a receiving basket.

16. A method for removing dirt and debris from clumps of cotton that are released from slots of a group of retrieving belts as the belts pass around a rotating pulley means that causes the slots to open, said method comprising the steps of:

(a) catching the released clumps in a lower portion of a first region that is bounded by the portions of the belts passing around the pulley means and a first group of curved, spaced tines disposed adjacent to said portions of the belts;

(b) forcing the clumps to move along the tines of the first group from the lower portion of the first region to an upper portion thereof, said forcing loosening dirt and/or debris from the clumps, said loosened dirt and/or debris falling between the tines of said first group; and (c) ejecting the clumps from the upper portion of the first region.

17. The method of claim 16 wherein said forcing of the clumps includes the step of moving cotton-engaging elements through said first region from the bottom to the top thereof.

18. The method of claim 17 wherein said cotton-engaging elements include finger elements attached to the pulley means and extending from between the belts into the first region.

19. The method of claim 17 further including the steps of moving the ejected clumps into a lower portion of a second region that is bounded by the ends of peg elements of a rotating peg drum and a second group of curved, spaced tines disposed adjacent to the peg drum and forcing the ends of the peg elements against the clumps in the second region as the peg drum rotates to break up and further loosen dirt and/or debris in the clumps, that loosened dirt and/or debris falling between the tines of the second group, and ejecting the clumps fron an upper portion of the second region.

20. The method of claim 19 wherein said ejecting from the upper portion of the second region includes ejecting the clumps into an auger housing, said method including the steps of conveying the clumps in the auger housing by means of an auger blade to a rotating cleaning saw assembly, grasping the clumps and moving them past a kicker by means of teeth of the cleaning saw assembly, and thumping the clumps against blades of the kicker to further loosen dirt and/or debris from the clumps.

21. The method of claim 20 further including the steps of blowing air against the clumps as they are moved past the kicker to separate loosened dirt and/or debris from the clumps and doffing the clumps from the teeth of the cleaning saw assembly by means of a doffer-fan and creating an air flow that carries the clumps into a receiving and retaining basket.

22. The method of claim 21 wherein said blowing step includes creating a stream of said air by means of the doffer-fan.

* * * * *